United States Patent
Yamkovoy

(10) Patent No.: US 11,626,095 B2
(45) Date of Patent: *Apr. 11, 2023

(54) ACOUSTIC NOISE REDUCTION AUDIO SYSTEM HAVING TAP CONTROL

(71) Applicant: Bose Corporation, Framingham, MA (US)

(72) Inventor: Paul G. Yamkovoy, Acton, MA (US)

(73) Assignee: Bose Corporation, Framingham, MA (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/306,479

(22) Filed: May 3, 2021

(65) Prior Publication Data

US 2021/0256950 A1 Aug. 19, 2021

Related U.S. Application Data

(63) Continuation of application No. 16/511,905, filed on Jul. 15, 2019, now Pat. No. 10,997,959, which is a continuation of application No. 15/895,415, filed on Feb. 13, 2018, now Pat. No. 10,354,641.

(51) Int. Cl.
*G10K 11/178* (2006.01)
*H04R 1/10* (2006.01)
*G06F 3/16* (2006.01)

(52) U.S. Cl.
CPC ........ *G10K 11/17823* (2018.01); *G06F 3/165* (2013.01); *G10K 11/1783* (2018.01); *G10K 11/17821* (2018.01); *G10K 11/17875* (2018.01); *G10K 11/17881* (2018.01); *H04R 1/1041* (2013.01); *H04R 1/1083* (2013.01); *G10K 2210/1081* (2013.01); *G10K 2210/3028* (2013.01); *G10K 2210/3046* (2013.01); *H04R 2201/028* (2013.01)

(58) Field of Classification Search
CPC .............................................. G10K 11/17823
See application file for complete search history.

(56) References Cited

U.S. PATENT DOCUMENTS

2011/0249824 A1* 10/2011 Asada .................. H04R 1/1041
381/56

* cited by examiner

Primary Examiner — Olisa Anwah

(57) ABSTRACT

An acoustic noise reduction (ANR) headphone described herein has current detection circuitry that detects current consumed by an acoustic driver amplifier as a result of pressure changes due to a tapping of the headphone. Tapping may be performed to change an audio feature or operating mode of the audio system for the headphone. The current detection circuitry senses a characteristic of the current consumed by the acoustic driver amplifier that can be used to determine an occurrence of a tap event. Examples of a characteristic include an amplitude, waveform or duration of the sensed current. Advantageously, the ANR headphones avoid the need for control buttons to initiate the desired changes to the audio feature or operating mode.

20 Claims, 6 Drawing Sheets

ACOUSTIC NOISE REDUCTION AUDIO SYSTEM HAVING TAP CONTROL

CROSS-REFERENCE TO RELATED APPLICATIONS

This application claims priority of U.S. patent application Ser. No. 16/511,905, filed on Jul. 15, 2019, which claims priority of U.S. patent application Ser. No. 15/895,415, now U.S. Pat. No. 10,354,641, filed on Feb. 13, 2018, the entire disclosure of the all of the aforementioned is incorporated herein by reference for all purposes.

BACKGROUND

This description relates generally to controlling the mode of an audio device and, more specifically, to acoustic noise reduction (ANR) headphones or headsets that can be controlled by the tap or touch of a user.

SUMMARY

In one aspect, an ANR audio system having tap control includes an ANR module, a current sensor, a signal conditioner module and an audio and mode control module. The ANR engine includes a first ANR engine input to receive an audio input signal, a second ANR engine input to receive a first supply current from a power supply through a first electrical path, and an ANR engine output to provide an audio output signal. The ANR engine also includes an acoustic driver amplifier having a first driver amplifier input to receive a second supply current from the power supply through a second electrical path, a second driver amplifier input in communication with the ANR engine output to receive the audio output signal and a driver amplifier output to provide an amplified audio output signal. The current sensor is disposed in the second electrical path and has a sensor output to provide a signal responsive to a characteristic of the second supply current. The signal conditioner module has an input in communication with the sensor output and has a signal conditioner output. The signal conditioner module provides a conditioned signal at the signal conditioner output in response to the signal responsive to the characteristic of the second supply current. The audio and mode control module has a first input to receive a source audio signal, a second input in communication with the signal conditioner output, and an output in communication with the first ANR engine input. The audio and mode control module controls at least one of a mode of operation of a headphone system and an attribute of the audio input signal in response to the conditioned signal.

Examples may include one or more of the following features:

The ANR audio system may further include an acoustic driver having a driver input in communication with the driver amplifier output of the acoustic driver amplifier to receive the amplified audio output signal.

The characteristic of the second supply current may include at least one of an amplitude of the second supply current, a waveform representing the second supply current and a duration of the second supply current.

The conditioned signal may be a logic level signal.

The current sensor may include an amplifier and a current sense resistor to receive the second supply current. The amplifier has a first input in communication with an end of the current sense resistor, a second input in communication with an opposite end of the current sense resistor, and an amplifier output to provide a voltage signal responsive to a voltage across the current sense resistor. The signal conditioner module may include at least one of a band-pass filter and a low-pass filter in communication with the amplifier output of the current sensor. At least one of the band-pass filter and the low-pass filter may have a maximum pass frequency of approximately 10 Hz.

The audio and mode control module may control at least one of a selection of an audio source, a volume, a balance, a mute, a pause function, a forward playback function, a reverse playback function, a playback speed and a talkthrough function.

In accordance with another aspect, a method for controlling an ANR audio system includes separating a supply current from a power supply into a first current flowing to an ANR engine along a first electrical path and a second current flowing to an acoustic driver amplifier along a second electrical path. The second current flowing along the second electrical path to the acoustic driver amplifier is sensed. A determination is made from the sensed second current that a tap event occurred. At least one of a mode of operation of the audio system and an attribute of an audio input signal is changed in response to the tap sequence of the tap event.

Examples may include one or more of the following features:

The sensing of the second current may include sensing at least one of an amplitude of the second current, a waveform representing the second current and a duration of the second current.

The attribute of the audio input signal may include at least one of a selection of an audio source, a volume, a balance, a mute, a pause function, a forward playback function, a playback speed and a reverse playback function.

In accordance with another aspect, a headphone includes a microphone, an ANR module, a current sensor, a signal conditioner module and an audio and mode control module. The microphone detects a pressure change in a cavity of the headphone, wherein the cavity includes an ear canal of a wearer of the headphone. The ANR module includes an ANR engine having a first ANR engine input to receive an audio input signal, a second ANR engine input to receive a first supply current from a power supply through a first electrical path, a third ANR engine input in communication with the microphone, and an ANR engine output to provide an audio output signal. The ANR module further includes an acoustic driver amplifier having a first driver amplifier input to receive a second supply current from the power supply through a second electrical path, a second driver amplifier input in communication with the ANR engine output to receive the audio output signal, and a driver amplifier output to provide an amplified audio output signal. The current sensor is disposed in the second electrical path and has a sensor output to provide a signal responsive to a characteristic of the second supply current. The signal conditioner module has an input in communication with the sensor output and has a signal conditioner output. The signal conditioner module provides a conditioned signal at the signal conditioner output in response to the signal responsive to the characteristic of the second supply current. The audio and mode control module has a first input to receive a source audio signal, a second input in communication with the signal conditioner output, and an output in communication with the first ANR engine input. The audio and mode control module controls at least one of a mode of operation of a headphone system and an attribute of the audio input signal in response to the conditioned signal.

Examples may include one or more of the following features:

The headphone may further include an acoustic driver having a driver input in communication with the driver amplifier output of the acoustic driver amplifier to receive the amplified audio output signal.

The attribute of the audio input signal may include at least one of a selection of an audio source, a volume, a balance, a mute, a pause function, a forward playback function, a playback speed and a reverse playback function.

BRIEF DESCRIPTION OF THE DRAWINGS

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Figure 1:
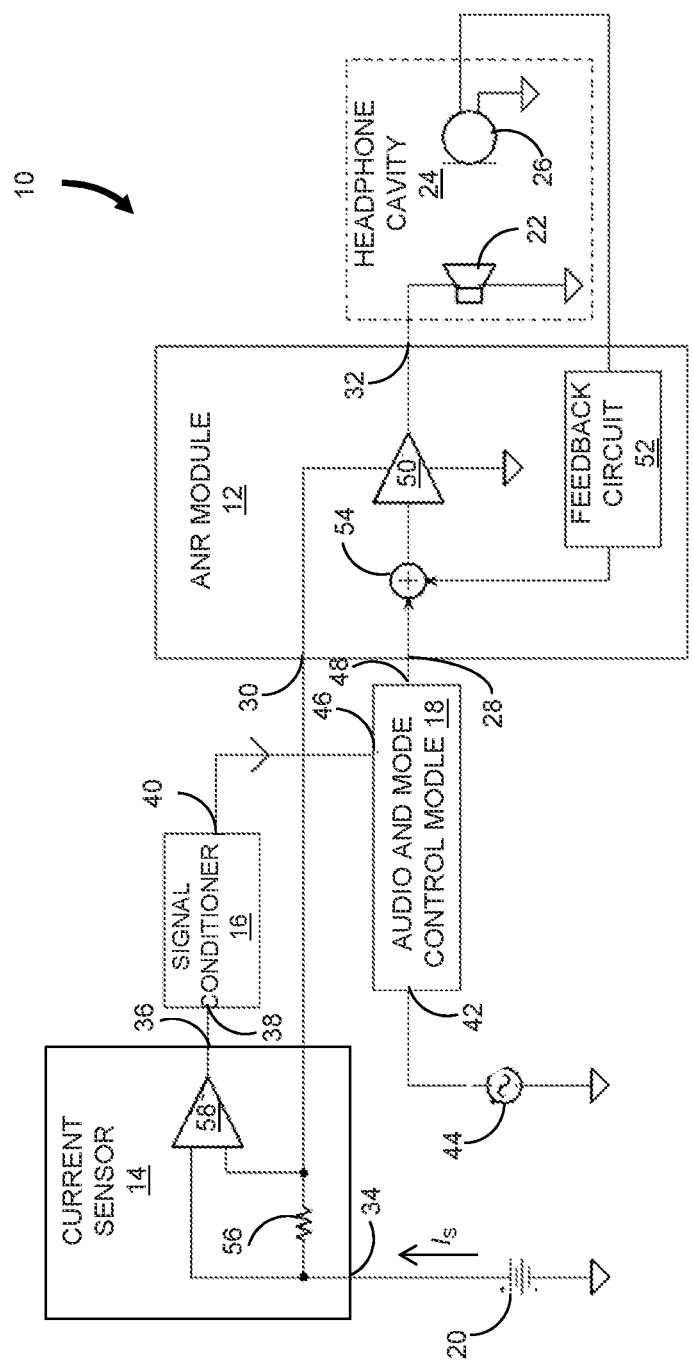
FIG. 1 is a functional block diagram of an example of a circuit for an ANR audio system having tap control.

Various implementations described below allow a user to touch the outside of a headphone or headset, or to touch the ear or nearby head as a means to instruct the performance of a desired function. As used herein, an ANR headphone is any headphone or headset component that can be worn in or about the ear to deliver acoustic audio signals to the user or to protect the user's hearing, provides acoustic noise reduction or cancellation and has an exposed surface that can be tapped by a user. For example, an ANR headphone can be an ear cup that is worn on or over a user's ear, has a cushion portion that extends around the periphery of the opening to the ear as an acoustic seal, and a hard outer shell. ANR headphones, as used herein, also include ANR earbuds that are typically at least partially inserted into the ear canal and have an exposed surface that a user can tap or allow the user to tap the ear or a nearby region of the head.

Taps occurring in succession during a brief time period (e.g., several seconds) are defined herein as a "tap event." As used herein, a "tap sequence" refers to the content of the tap event, that is, the number of individual taps in the tap event. The tap sequence can be a single tap or can be two or more taps.

A tap event may be used to change a mode of operation of headphones or other components integrated with an ANR audio system. For example, the tap event can be used to change a headphone set from audio playback mode to a telephone communications mode. Alternatively, the tap event can be used to change a feature available in one mode that may not be available in a different mode. Thus, the mapping of specific tap sequences to associated functions is defined according to the particular mode of operation of the ANR audio system. The tap event is interpreted in light of the current mode. For example, a tap sequence defined by a single tap during playback may be interpreted as an instruction to pause the current audio playback. In contrast, a single tap during telephone communications may be interpreted as an instruction to place a telephone call on hold. Other examples include tapping a headphone one or more times to change the volume of an audio signal during playback, to skip to a subsequent audio recording in a playlist or sequence of recordings, to pause audio playback and to pair the headphones with another device via wireless communication, for example, using Bluetooth. Advantageously, the detection of the tapping of the external portion of an ANR headphone, the ear or the head uses existing functionality within the ANR headphone. Moreover, the taps are reliably detected and can be used to control features available within a particular mode of operation of the headphones and to change to a different mode.

In an ANR headphone, noise is detected by a feedback microphone and ANR circuitry generates a compensating signal to cancel that noise. Conventional ANR circuitry does not distinguish between the various sources of pressure changes detected by the feedback microphone. The pressure change can be acoustic noise or can be the result of a touching of an exposed surface of the headphone, the external portion of the ear or a region of the head near to the headphone to cause an acoustic or subsonic pressure change. In response to the tap, the ANR circuitry generates a compensating signal.

In various examples, the visible portion of the ear made up of cartilage and skin, and which exists outside the head (i.e., the auricle or pinna), may be tapped to cause the pressure change in the sealed ear canal. Certain portions of the auricle, such as the helix, tragus, or antihelix, are more easily accessible to the user and can be tapped. As used herein, a tap or headphone tap includes a direct touching of a headphone or any intended touching of the ear or region of the head near the ear that causes a pressure change in the sealed ear canal. Tapping includes tugging, "flicking" or pulling of skin and/or cartilage of the ear or a portion of the head or skin on the head near the headphone. As used herein, a sealed ear canal includes a substantially sealed ear canal in which a complete seal does not exist. For example, there may be a small gap between the headphone and the ear can through which air may pass and thereby reduce the amplitude of the pressure change for a tap; however, the pressure change may be sufficient for recognizing the pressure change as a tap.

Examples of ANR headphones and ANR systems described herein take advantage of a difference between general acoustic noise and taps to a headphone based on a difference in the electrical current consumed by the ANR circuitry. More specifically, a power supply current detection circuit is used to distinguish current consumed as a result of acoustic noise from current consumed by a tap event. A tap event results in high pressure within the headphone, and generally draws more current from the power supply than that used to generate an acoustic noise cancelling signal. When the current detection circuit senses a characteristic of the current, such as an amplitude and/or waveform or duration, that corresponds to an occurrence of a tap event, a signal indicative of the tap sequence for the tap event is provided to a microcontroller for interpretation. For example, the microcontroller may be part of an audio and mode control module which initiates the changes to audio features and operating mode of the ANR system. The time occurring between consecutive taps in a single tap sequence can be defined to be less than a predefined duration or a tap sequence can require that all taps occur within a predefined time interval, for example, several seconds. Advantageously, the ability to tap a headphone to cause a change in mode or audio signal attribute avoids the use of control buttons to implement similar functions. Control buttons are often problematic for a user, especially when the buttons are located on a portion of the system that may be located in a pocket or on the arm of a user, or are located on a small or difficult to reach area of the headphone. For example, in the context of headsets used by pilots in aircraft, searching for buttons that are located on a peripheral or difficult to reach area may be distracting from focusing on the surroundings and the pilot's primary task.

FIG. 1 is a functional block diagram of an example of a circuit 10 for an ANR audio system having tap control. The circuit 10 includes an ANR module 12, a current sensor 14, a signal conditioner module 16, an audio and mode control module 18 and a power supply 20. The circuit 10 is configured to provide a signal to drive at least one acoustic driver ("speaker") 22 in a headphone cavity 24 and to receive a microphone signal from a microphone 26 in the headphone cavity 24. Although shown separately, it will be appreciated in light of the description below that certain elements of the signal conditioner module 16 and audio and mode control module 18 may be shared elements.

The ANR module 12 includes a first input 28 that receives an audio input signal from the audio and mode control module 18 and a second input 30 that receives a supply current $I_S$ from the power supply 20. By way of example, the power supply can be one or more batteries, DC power provided by the audio source, or may be an electrical power converter such as a device that uses alternating current (AC) power and provides direct current (DC) power at a desired voltage level. The ANR module 12 includes an ANR output 32 that provides an audio output signal to the speaker 22. In the illustrated circuit 10, the ANR module 12 also includes various other components including an amplifier 50, feedback circuitry 52 and a summing node 54 as are known in the art. Although shown as using feedback compensation, the ANR module 12 can alternatively use feedforward correction or a combination of feedback correction and feedforward correction based, at least in part, on a microphone signal generated by the microphone 26 in response to received acoustic energy. In a feedforward implementation, an additional microphone (not shown) may be used to detect noise external to the headphone, and provide a signal cancelling that noise. When both feedforward and feedback correction are used, the feedback microphone 26 detects the residual noise in the headphone cavity 24 after the feedforward system has functioned to cancel noise detected external to the headphone.

The current sensor 14 has a sensor input 34 to receive the supply current $I_S$ from the power supply 20 and a sensor output 36 that provides a signal responsive to a characteristic (e.g., an amplitude and/or waveform or duration) of the supply current $I_s$. The signal conditioner module 16 includes an input 38 in communication with the output 36 of the current sensor 14 and an output 40 that provides a conditioned signal to the audio and mode control module 18. The conditioned signal is a logic level signal (e.g., a low or high logic value digital pulse) generated according to the signal provided at the sensor output 36. As illustrated, the current sensor 14 includes a "sensing" resistor 56 and an amplifier 58 having differential inputs to sense a voltage across the resistor 56.

The audio and mode control module 18 includes an input 42 to receive a signal from an audio source 44, another input 46 to receive the conditioned signal and an output 48 in communication with the first input 28 of the ANR module 12. The audio source for the headphone may be different than the audio source for a second headphone (not shown). For example, one audio source may provide a left channel audio signal and the other audio source may provide a right channel audio signal. The audio and mode control module 18 is used to control a mode of operation of the ANR audio system, an attribute of the audio input signal, or both, in response to the conditioned signal. Examples of modes include, but are not limited to, music playback, telephone mode, talk through mode (e.g., temporary pass through of a detected voice), a level of desired ANR, and audio source selection. Examples of attributes of the audio input signal include, but are not limited to, volume, balance, mute, pause, forward or reverse playback, playback speed, selection of an audio source, and talk through mode.

During typical operation, the audio output signal from the ANR module 12 is received at the speaker 22 and results in production of an acoustic signal that substantially reduces or eliminates acoustic noise within the headphone cavity 24. The audio output signal may also generate a desired acoustic signal (music or voice communications) within the headphone cavity 24.

Figure 2:
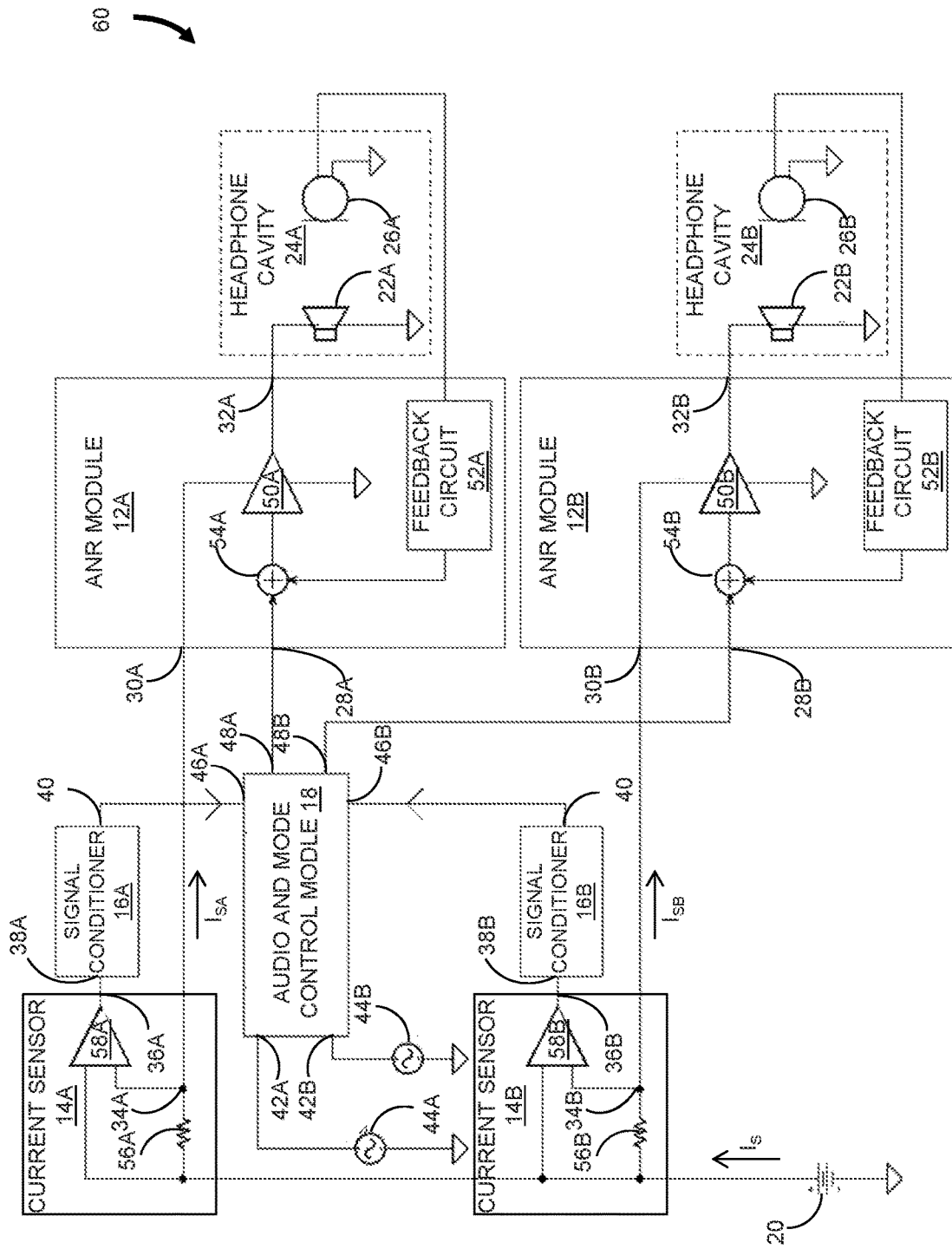
FIG. 2 is a functional block diagram of an example of circuitry for an ANR audio system having tap control.

ANR headphones generally operate in a manner to independently reduce acoustic noise in each headphone. Thus, each ANR headphone includes all the components shown in FIG. 1 except for the audio and mode control module 18 and power supply 20 which may be "shared" with each headphone. FIG. 2 is a functional block diagram of an example of circuitry 60 that includes circuits for implementing ANR for a headphone system. The circuitry 60 includes two circuits that are similar to the circuit 10 of FIG. 1. Reference numbers in the figure that are followed by an "A" indicate elements associated with a circuit for one headphone (e.g., left headphone) and reference numbers followed by a "B" indicate elements associated with a circuit for the other headphone (e.g., right headphone). Reference numbers lacking an "A" or "B" are generally associated with shared circuit components, though in some examples, they may be provided individually in each headphone.

Figure 3:
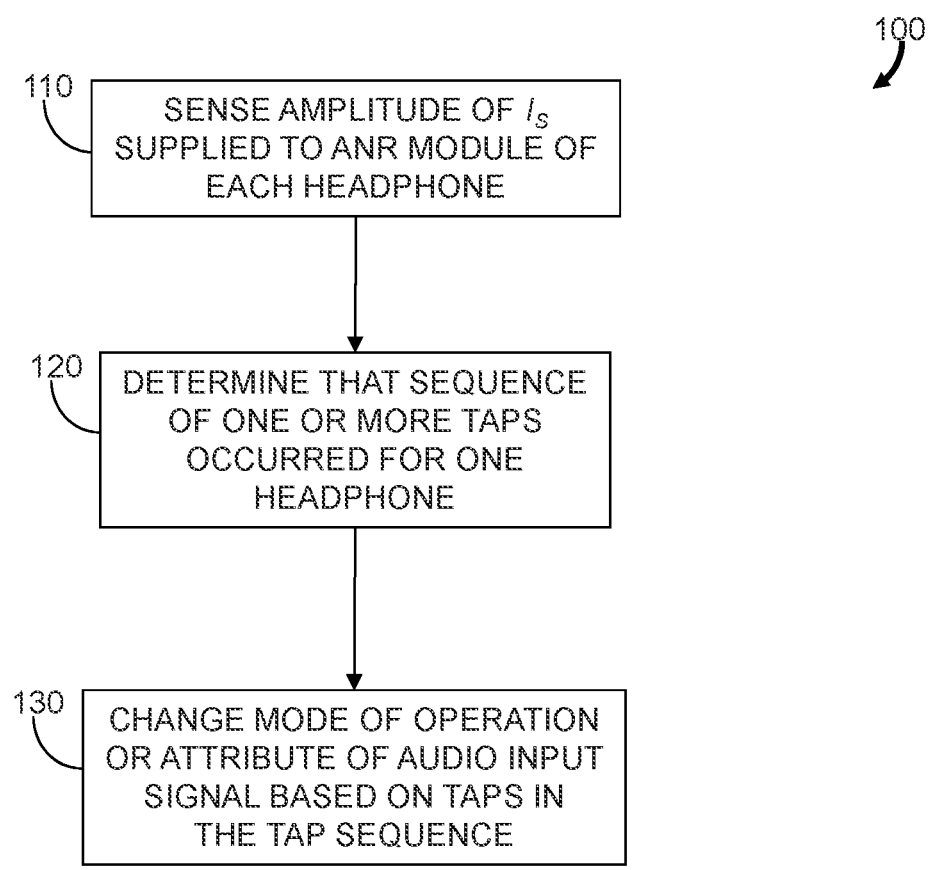
FIG. 3 is a flowchart representation of an example of a method for controlling an ANR audio system having tap control.

Reference is also made to FIG. 3 which shows a flowchart representation of an example of a method 100 for controlling an ANR audio system having tap control. During operation, the amplitude and/or waveform or duration of the supply current $I_S$ to each headphone is sensed (step 110) by monitoring the voltage drop across the sensing resistor 56. When an ear cup (or earbud) is tapped by a user or when the ear or region of the user's head near to the ear is tapped, the volume of the cavity defined by the ear cup and the user's ear canal changes due to the compliances of the cushion and user's skin. The result is a change in the pressure within the ear cup and ear canal, which is sensed by the microphone 26. The ANR module 12 responds by sending an electrical signal to the speaker 26 that produces an acoustic signal within the cavity intended to eliminate the pressure change caused by the tap. The electrical signal provided at the output 32 of the ANR module 12 is sourced from the amplifier 50 which in turn consumes the supply current $I_S$ from the power supply 20. Thus, a tap applied by a user to the headphone can be recognized as a significant variation in the amplitude and/or waveform or duration of the supply current $I_S$.

The user may simply tap the headphone, ear or head a single time or may make multiple taps in rapid succession in order to change in a mode of operation of the ANR system or an attribute of the audio signal received from the audio sources 44. A determination is made (step 120) that a sequence of taps, including a single tap or multiple taps, has occurred. The mode of operation of the ANR system or an attribute of the audio input signal is changed (step 130) in response to the taps in the sequence. The steps of the method 100 are executed using the current sensor 14, signal conditioner module 16 and audio and control module 18. As each headphone has a current sensor 14 and a signal conditioner 16, either headphone or its associated ear or head region can be tapped to change the mode of operation or audio input signal attribute. Moreover, as described in more detail below, the simultaneous monitoring of the supply current $I_s$ for each headphone allows the determination according to step 120 to include a discrimination between a valid user tap and a different event that might otherwise be erroneously interpreted as a user tap. By way of example, a disturbance common to both headphones, such as dropping a headphone set, disconnecting the headphone set from an audio system or the occurrence of a loud "external acoustic event", may result in a determination that both headphones have been tapped by a user. If it appears that both headphones have been tapped at nearly the same time, the ANR audio system ignores the disturbance and the mode and audio signal attributes remain unchanged.

Figure 4:
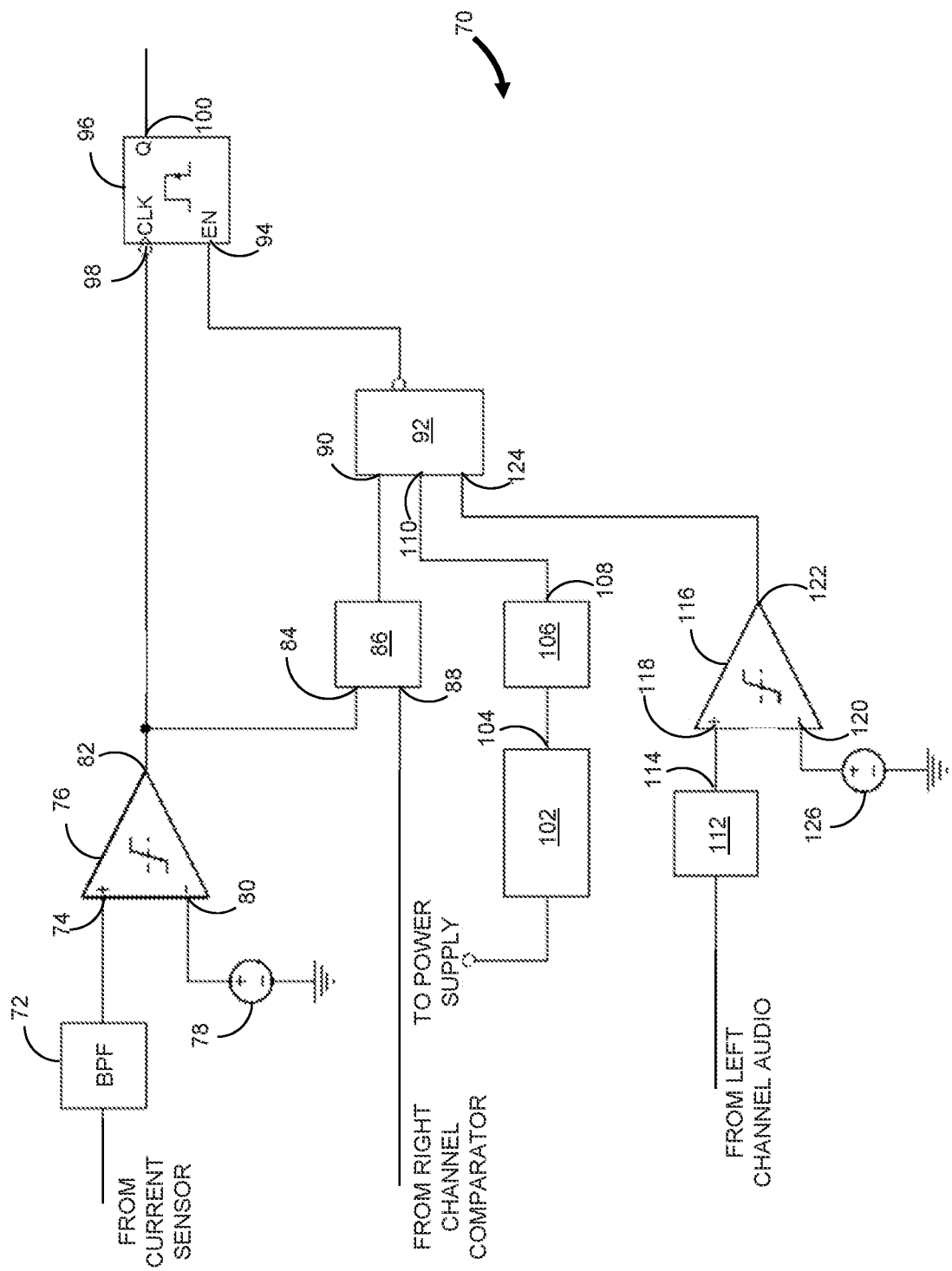
FIG. 4 is a functional block diagram of a circuit that may be used to implement one of the signal conditioner modules and the audio and mode control module of FIGS. 1 and 2.

Various circuit elements can be used to implement the modules present in the circuitry 60 of FIG. 2. For example, FIG. 4 shows a functional block diagram of a circuit 70 that may be used to implement the signal conditioner module 16A for the left headphone (similar circuitry could be used for the right headphone) and the audio and mode control module 18. Referring to FIG. 2 and FIG. 4, the circuit 70 includes a band-pass filter (BPF) 72, which filters the signal provided by the amplifier 58 in the current sensor 14. In other examples, the filter may be a low-pass filter. By way of one non-limiting example, the band-pass filter 72 can have a minimum pass frequency of approximately 0.1 Hz and, in another example, the band-pass filter 72 (or low-pass filter) can have a maximum pass frequency of approximately 10 Hz. A non-zero minimum pass frequency prevents a near-DC event, such as a slow pressure application in which a headphone is slowly pressed against an object, such as a chair, from being interpreted as a tap event. The filtered signal is received at a first input 74 of a comparator 76 and a reference voltage source 78 is coupled to a second input 80 of the comparator 76. By way of example, the reference voltage source 78 can be a voltage divider resistive network coupled to a regulated power supply. A comparator output signal at the comparator output 82 is a logic value (e.g., HI) that indicates a possible tap event when the voltage at the first input 74 exceeds the "threshold voltage" applied to the second input 80 and otherwise is a complementary logic value (e.g., LO).

The comparator output signal, indicative of a possible tap event when at a logic HI value, is applied to a clock input 98 of a monostable vibrator 96. There can be occurrences when a signal of sufficient frequency and amplitude can cause excessive current through the current sensor 14 and therefore cause an affirmative signal at the comparator output 82 yet not result from a valid tap to a headphone. For example, a loud noise near a user might be sufficient to cause the comparator output signal to indicate a tap event. The circuit 70 provides further components to prevent invalid events from being interpreted as valid tap events. The comparator output signal is also applied to an input terminal 84 of an AND gate 86 and the comparator output signal from a counterpart comparator (e.g., right channel comparator, not shown) for the other (e.g., right) headphone channel is provided to the other input terminal 88. Thus, the AND gate 86, which is applied to an input 90 of a NOR gate 92, produces a logic value (e.g., HI) if the comparator output signals for both the left and right headphone channels are logic HI. In turn, the NOR gage 92 inverts the logic HI signal to a logic LO signal that is applied to the enable input 94 of the monostable vibrator 96, thereby disabling the comparator output signal applied to the clock input 98 of the monostable vibrator 96 from appearing at the output 100. Thus, occurrences that would generate a change in pressure in both the left and right headphones that could be mistaken for a tap event (e.g., a loud noise near the user), are not interpreted as a tap event.

Another potential means for causing an erroneous determination of a tap event is a power supply transient event such as a powering on or powering off transient condition. A voltage detector 102 is in communication with the power supply and provides a logic signal (e.g., HI) at its output 104 indicating an excessive power supply voltage, that is, that the applied voltage has transitioned from less than a threshold voltage to greater than a threshold voltage. Conversely, the logic signal at the output 104 will change to a complementary logic value (e.g., LO) when the applied voltage transitions from greater than the threshold voltage to less than the threshold voltage. A delay module 106 receives the logic HI signal from the voltage detector 102 and holds the logic value until the expiration of a set time period (e.g., 0.5 s, though other periods of time could be used). This signal is applied to a second input 110 of the NOR gate 92 which in turn disables the monostable vibrator 96 to prevent a false indication of a tap event.

In addition, there can be unwanted transients in an audio channel of the headphone. For example, if a headphone jack is plugged into an audio device or if there is an electrostatic discharge occurrence, there may be a loud noise such as a "popping" or "crackling" due to an excessive peak voltage in the audio signal which, if not properly processed, may be sufficient to trigger a false indication of a tap event. An amplitude threshold module 112 receives the left channel audio signal and provides a delayed output signal at the output terminal 114 with a value corresponding to peaks in the voltage level of the audio signal. A comparator 116 receives the output signal from the delay module 112 at a first input terminal 118 and a voltage from a reference voltage source 126 is applied to a second input terminal 120. The reference voltage is selected to correspond to a voltage value above which the delayed output signal is considered to indicate an audio occurrence that is not a valid tap event. Thus, if the signal at the first input terminal 118 exceeds the signal at the second input terminal 120, a logic HI signal is generated at the comparator output 122 and applied to an input 124 of the NOR gate 92. As a result, the NOR gate 92 applies a logic LO signal to the enable input 94 of the monostable vibrator 96 to disable the comparator output signal at the clock input 98 of the monostable vibrator 96 from appearing at the output 100.

In the detection of error conditions described above, the NOR gate 92 is a logic element that includes a number of inputs with each input receiving a logic signal indicative of a particular error condition. The output of the logic element provides a logic signal having a first state if at least one of the error conditions exists and a second state if none of the error conditions exist. The logic signal at the output is used to prevent a determination of a tap event for circumstances unrelated to a tap event. Thus, the circuit 70 described above provides for determining the states of various error conditions, that is, conditions that can lead to a determination of a tap event without a user actually tapping a headphone. The circuit 70 prevents such conditions from causing a change in an audio attribute or operational mode of ANR headphones or an ANR audio system.

In one alternative configuration, the comparator 76 is implemented instead as a discriminator that uses two thresholds instead of a single threshold to determine a valid tap event. The two thresholds may be selected so that the filtered signal from the bandpass filter 72 is interpreted to indicate a valid tap event if the voltage exceeds a lower threshold voltage and does not exceed the higher threshold voltage. In this way extreme amplitude events that "pass" the lower threshold voltage requirement, but are not initiated by a user tap, are prevented from being interpreted as valid tap event. By way of one example, removing a single headphone from the head of a user may result in such a high amplitude event.

Referring again to the examples of circuits for an ANR audio system having tap control as shown in FIGS. 1 and 2 and described above, the supply current $I_S$ provided to the ANR module 12 is sensed to determine the occurrence of a tap event. The current consumed by the amplifier 50 is typically insignificant compared to the current consumed by other components of the ANR module 12. These other components are collectively referred to below as an ANR engine and the current consumed by the ANR engine is referred to as a quiescent current. Even during a tap, the increased current consumed by the amplifier 50 is substantially less than the quiescent current which remains nearly constant regardless of the magnitude of the audio input signal. Consequently, it can be difficult to sense the change in the supply current $I_S$ due to a tap event since the supply current is primarily consumed by the ANR engine. Stated alternatively, it can be difficult to sense a small current spike that is present on a much greater constant quiescent current.

Figure 5:
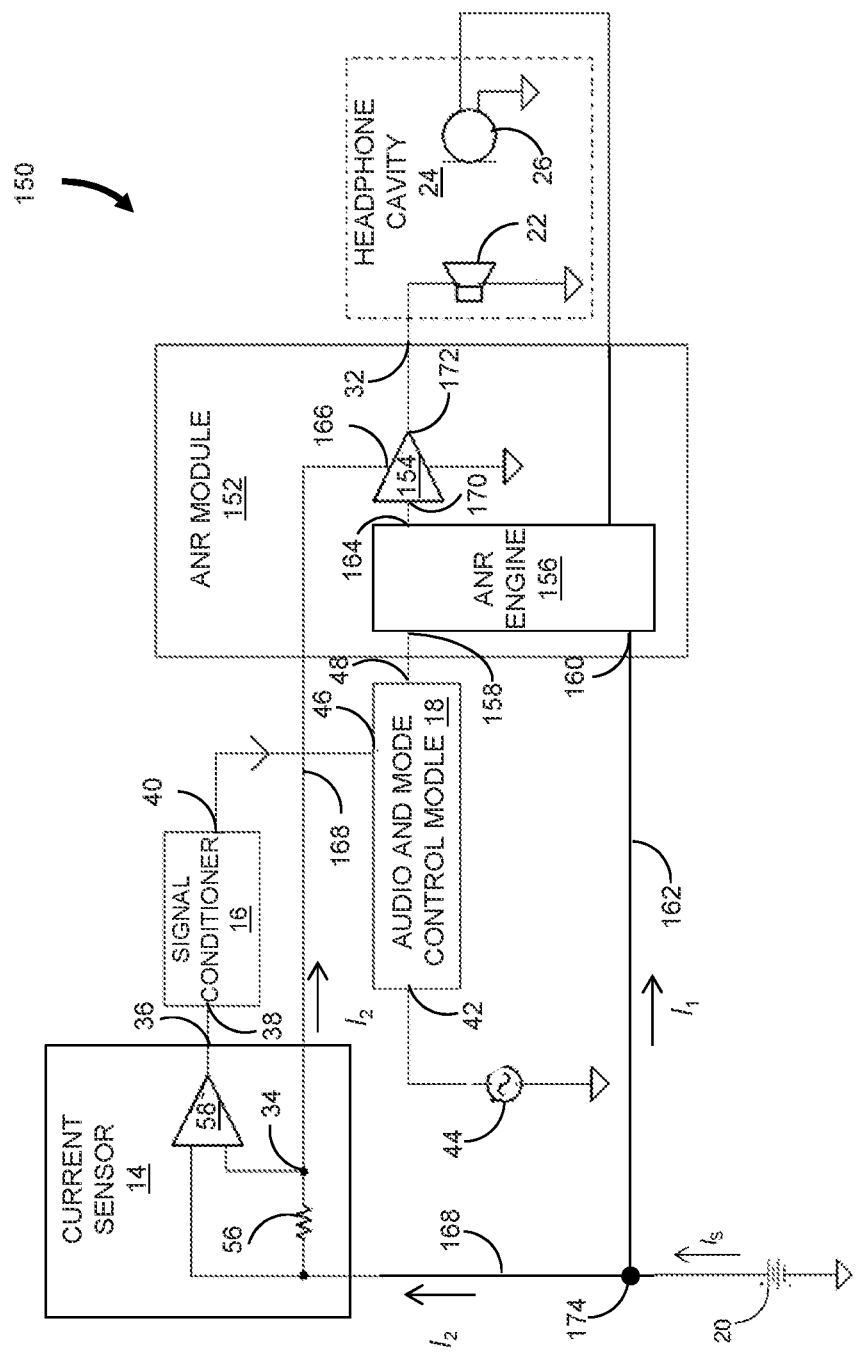
FIG. 5 is a functional block diagram of another example of a circuit for an ANR audio system having tap control.

FIG. 5 is a functional block diagram of an example of a circuit 150 for an ANR audio system having tap control. The circuit 150 includes components similar to those depicted in FIG. 1, including an ANR module 152 having an acoustic driver amplifier 154 and an ANR engine 156. The ANR engine 156 may include all the elements of the ANR module 152 other than the amplifier 154. For example, the ANR engine may include elements of the feedback circuit 52 of FIG. 1 and/or components of a feedforward circuit.

The ANR engine 156 has a first ANR engine input 158 to receive an audio input signal, a second ANR engine input 160 to receive a first supply current $I_1$ conducted through a first electrical path 162 and an ANR engine output 164 to provide an audio output signal. The acoustic driver 154 has a first driver amplifier input 166 to receive a second supply current $I_2$ conducted through a second electrical path 168, a second driver input 170 in communication with the ANR engine output 164 to receive the audio output signal, and a driver amplifier output 172 to provide an amplified audio output signal.

A power supply 20, such as a battery, provides a supply current $I_S$ which is separated into two separate currents at node 174. More specifically, the first supply current $I_1$ flows from the node 174 along the first electrical path 162 to the ANR engine 156 and the second supply current $I_2$ flows from the node 174 along the second electrical path 168 through the current sensor 14 to the acoustic driver amplifier 154.

In the illustrated circuit 150, the current sensor 14 senses only the second supply current $I_2$. Thus, the spike in the magnitude of the sensed current is a substantially larger portion of the total current though the current sensor 14 than for the circuit 10 of FIG. 1 as the second supply current $I_2$ is nearly zero other than during a tap event. As a result, the detection of a tap event with the circuit 150 is generally more robust.

Figure 6:
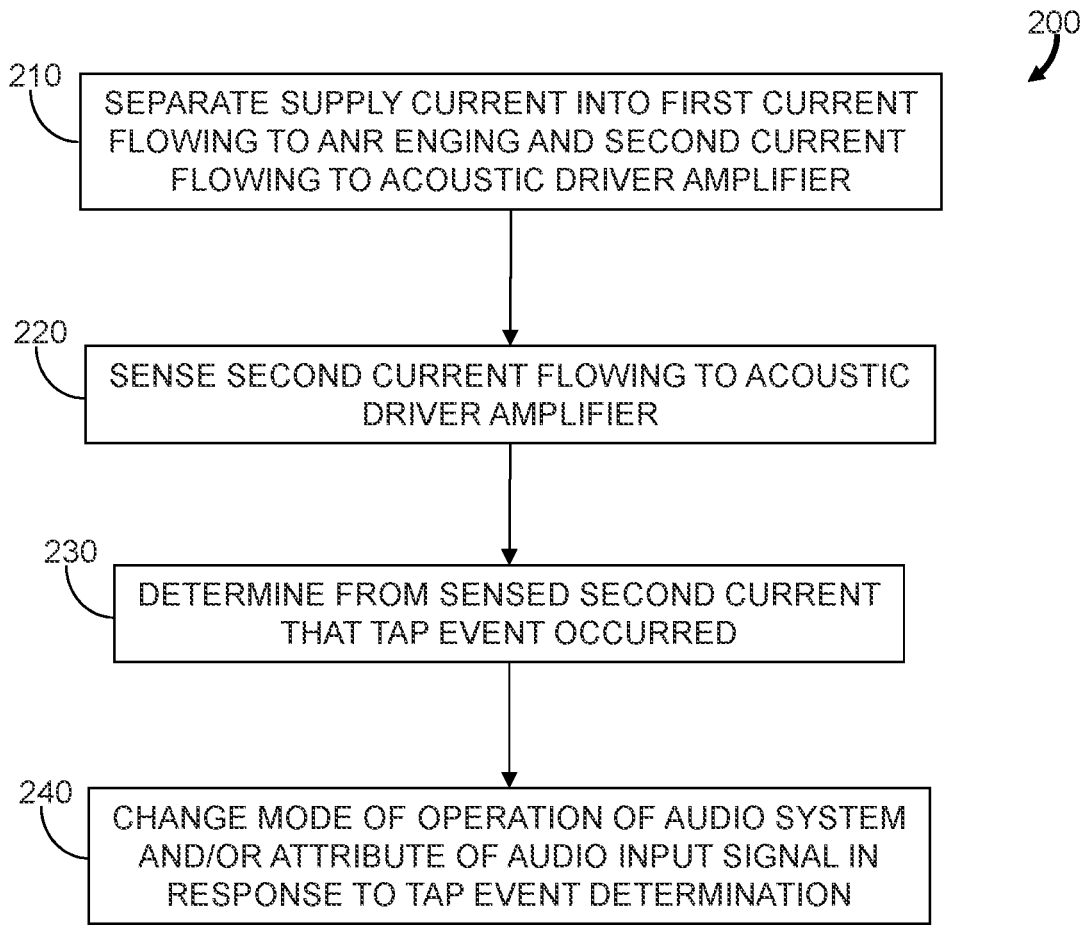
FIG. 6 is a flowchart representation of another example of a method for controlling an ANR audio system having tap control.

Reference is also made to FIG. 6 which is a flowchart representation of another example of a method 200 for controlling an ANR audio system having tap control. According to the method 200, the supply current $I_S$ from the power supply 20 is separated (step 210) into a first current $I_1$ flowing along the first electrical path 162 to the ANR engine 156 and a second current $I_2$ flowing to the acoustic driver amplifier 154. The second current $I_2$ is sensed (step 220) by the current sensor 14. A determination is made (step 230) from the sensing of the second current $I_2$ that a tap event occurred. In response to determining the tap event, a mode of operation of the audio system and/or an attribute of an attribute of the audio input signal is changed (step 240).

In other examples of circuits for an ANR audio system having tap control, the current sensor 14 and/or signal conditioner 16 may be included as a component in the ANR module 152 as long as they are disposed along the second electrical path 168. Moreover, the ANR engine 156 may be on an integrated circuit (IC) chip and the acoustic driver amplifier may be a discrete element or a component on a second IC chip. The circuit 150 can be implemented as a modification to the circuitry 60 of FIG. 2, that is, the circuit 150 can be used with a left headphone and another circuit 150 used with a right headphone.

The circuitry of FIGS. 1, 2, 4 and 5 may be implemented with discrete electronics, by software code running on a digital signal processor (DSP) or any other suitable processor within or in communication with the headphone or headphones.

Examples of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that the foregoing description is intended to illustrate, and not to limit, the scope of the inventive concepts which are defined by the scope of the claims. Other examples are within the scope of the following claims.

What is claimed is:

1. An acoustic noise reduction (ANR) device comprising:
a speaker; and
at least one processor configured to
detect a waveform of a supply current from a power supply and
determine whether the supply current relates to acoustic noise or a tap based at least on the waveform of the supply current,
wherein,
in response to determining that the supply current relates to acoustic noise, produce, using the speaker, an acoustic signal that substantially reduces or eliminates the acoustic noise, and
in response to determining that the supply current relates to a tap, i) determine a tap sequence based at least on the tap and ii) cause one or more predefined functions to be performed based on the tap sequence.

2. The ANR device of claim 1, wherein the tap sequence includes only the tap and no other taps.

3. The ANR device of claim 1, wherein the tap sequence includes the tap and another tap.

4. The ANR device of claim 3, wherein said determine the tap sequence is further based on a duration between the tap and the other tap being less than a predefined duration.

5. The ANR device of claim 3, wherein said determine the tap sequence is further based on the tap and the other tap occurring within a predefined time interval.

6. The ANR device of claim 1, wherein said determining that the supply current relates to a tap includes comparing the waveform of the supply current of a left side of the ANR device to a right side of the ANR device.

7. The ANR device of claim 1, wherein said determining that the supply current relates to a tap includes detecting an amplitude of the waveform of the supply current.

8. The ANR device of claim 7, wherein said determining that the supply current relates to a tap further includes determining the amplitude of the supply current exceeds a threshold.

9. The ANR device of claim 1, wherein said determining that the supply current relates to a tap includes detecting a duration of the supply current.

10. The ANR device of claim 1, wherein the one or more predefined functions to be performed includes selection related to at least one of: an audio source, a volume, a balance, a mute, a pause function, a forward playback function, a reverse playback function, a playback speed, or a talk-through function.

11. A method of operating an acoustic noise reduction (ANR) device, the method comprising:
detecting a waveform of a supply current from a power supply;
determining whether the supply current relates to acoustic noise or a tap based at least on the waveform of the supply current;
in response to determining that the supply current relates to acoustic noise, producing, using a speaker, an acoustic signal that substantially reduces or eliminates the acoustic noise; and
in response to determining that the supply current relates to a tap, i) determining a tap sequence based at least on the tap and ii) causing one or more predefined functions to be performed based on the tap sequence.

12. The method of claim 11, wherein the tap sequence includes only the tap and no other taps.

13. The method of claim 11, wherein the tap sequence includes the tap and another tap.

14. The method of claim 13, wherein said determining the tap sequence is further based on a duration between the tap and the other tap being less than a predefined duration.

15. The method of claim 13, wherein said determining the tap sequence is further based on the tap and the other tap occurring within a predefined time interval.

16. The method of claim 11, wherein said determining that the supply current relates to a tap includes comparing the waveform of the supply current of a left side of the ANR device to a right side of the ANR device.

17. The method of claim 11, wherein said determining that the supply current relates to a tap includes detecting an amplitude of the waveform of the supply current.

18. The method of claim 17, wherein said determining that the supply current relates to a tap further includes determining the amplitude of the supply current exceeds a threshold.

19. The method of claim 11, wherein said determining that the supply current relates to a tap includes detecting a duration of the supply current.

20. The method of claim 11, wherein the one or more predefined functions to be performed includes selection related to at least one of: an audio source, a volume, a balance, a mute, a pause function, a forward playback function, a reverse playback function, a playback speed, or a talk-through function.

* * * * *